June 25, 1968 L. M. SPANDORFER 3,390,276

ONE-WAY TRANSMISSION LOGIC CIRCUIT

Filed Nov. 26, 1963 3 Sheets-Sheet 1

INVENTOR
LESTER M. SPANDORFER

BY Rene A. Kuypers

ATTORNEY

June 25, 1968 L. M. SPANDORFER 3,390,276

ONE-WAY TRANSMISSION LOGIC CIRCUIT

Filed Nov. 26, 1963 3 Sheets-Sheet 2

OR GATE

NOR GATE

OR GATE

NOR GATE

June 25, 1968 L. M. SPANDORFER 3,390,276

ONE-WAY TRANSMISSION LOGIC CIRCUIT

Filed Nov. 26, 1963 3 Sheets-Sheet 3

United States Patent Office 3,390,276

Patented June 25, 1968

3,390,276

ONE-WAY TRANSMISSION LOGIC CIRCUIT

Lester M. Spandorfer, Cheltenham, Pa., assignor to Sperry Rand Corporation, New York, N.Y., a corporation of Delaware Filed Nov. 26, 1963, Ser. No. 326,068
12 Claims. (Cl. 307—88)

ABSTRACT OF THE DISCLOSURE

A logical OR-NOR device has been devised in accordance with this invention which use thin film or ferrite core one-way transmission devices having a strong nonreciprocal relationship. In the OR arrangement, a plurality of memeory elements which are all magnetized in the same direction are interrogated either singly or simultaneously in combination. All of the memory elements are linked by a common sense line which in turn is connected to a specialized sense amplifier. Accordingly, when anyone or several of the memory elements are interrogated, the signal or signals, as the case may be, are induced in the sense line and are detected by the specialized sense amplifier. Since all of the memory elements are magnetized in the same direction the signal or signals which are cumulative detected by the sense amplifier indicate the logical OR function.

The logical NOR function is obtained by magnetizing all of the memory elements oppositely from that of the OR function memory elements.

This invention relates in general to a one-way transmission device. In particular, this invention relates to a planar thin film, a thin film-plated wire or a ferrite core used as a one-way transmission device in a logical circuit.

Heretofore, prior art one-way transmission devices, such as diodes, or one-way amplifying transmission devices, such as transistors and vacuum tubes, have not been satisfactory because they are not entirely reliable as circuit elements. A further shortcoming of the above-mentioned one-way transmission devices is that they are relatively expensive and require elaborate manufacturing techniques because of their complex structure. Another type of one-way transmission device, which may be characterized by the above discussed shortcomings are semiconductor Hall effect devices.

It is therefore an object of this invention to provide new and improved one-way transmission devices.

It is also an object of this invention to provide new and improved one-way transmission device, which are simple and economical to fabricate.

It is a further object of this invention to provide new one-way transmission devices, which are characterized by improved reliability.

It is still a further object of this invention to provide new and improved logic circuits employing the above-mentioned, improved one-way transmission devices.

It is another object of this invention to provide a new and improved OR gate incorporating the one-way transmission devices of this invention.

It is yet another object of this invention to provide a new and improved NOR gate employing the one-way transmission devices of this invention.

In accordance with a feature of this invention, there are provided passive one-way transmission device (i.e., devices wherein a signal present on an input terminal will be transmitted to an output terminal, but a signal present on an output terminal will not be re-transmitted to an input terminal) consisting of planar thin films, thin film-plated wires or ferrite cores. In other words, the planar thin films, thin film-plated wires or ferrite core one-way transmission devices do not have the same transfer characteristic in one direction of propagation as they have for the reverse direction of propagation. As a further feature, the above-mentioned one-way transmission devices are arranged to form conventional OR and NOR logic circuits.

The novel features that are considered characteristic of this invention are set forth with particularity in the appended claims. The invention itself, however, both as to its organization and method of operation, as well as additional objects and advantages thereof, will best be understood from the following description when considered in conjunction with the accompanying drawings, wherein:

Figure 1:
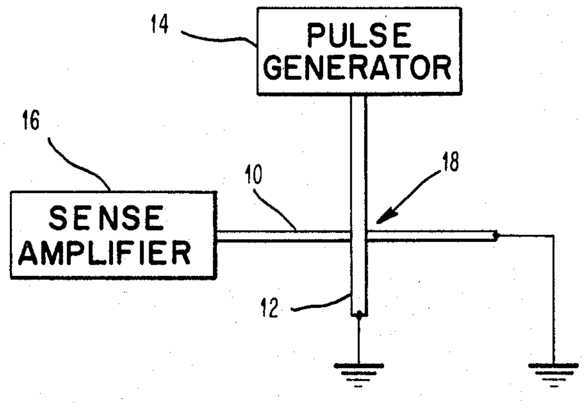
FIGURE 1 is a schematic view of a thin film-plated wire, one-way transmission device wherein its associated circuitry is shown in block form.

The instant invention provides one-way transmission devices consisting of either a planar thin film, a thin film-plated wire or a ferrite core element. The thin film-plated wire embodiment, for example, consists of a thin, Permalloy (i.e., iron-nickel) film formed on the surface of a small diameter wire substrate. The magnetic film is formed on the surface of the wire substrate in the presence of a magnetic field, thereby establishing a uniaxial anisotropy. This magnetic anisotropy establishes two stable positions along the "easy" direction of magnetization (i.e., along the circumference of the wire) and depending upon the orientation of the magnetization vectors along the "easy" direction of magnetization, a binary zero or binary one is stored thereon.

Positioned substantially orthogonal to the plated wire, which serves as a sense line, and in juxtaposition thereto is a drive line. Thus, when the drive line is momentarily energized by a pulse source, the magnetization vectors located at the bit position (i.e., the intersection of a drive line and a plated wire) are rotated from the "easy" toward the "hard" axis of magnetization. The rotation of the magnetization vectors from the "easy" toward "hard" axis of magnetization induces either a positive or negative polarity voltage in the sense line. The polarity of the induced voltage is a function of the vector orientation along the "easy" axis of magnetization (i.e., whether a binary zero or binary one has been stored) and is determined by a sense amplifier connected to the sense line.

The one-way transmission characteristic of the thin film-plated wire device is demonstrated by the fact that the voltage induced in the sense line by the energizing of the drive line is transmitted immediately to a sense amplifier, but a signal present on the sense line cannot be re-transmitted to the drive line. In other words, the thin film-plated wire, one-way transmission device of the instant invention provides a non-reciprocal network device (i.e., the open circuit transfer impedance as seen by the pulse generator connected to the drive line and the open circuit transfer impedance as seen by the sense amplifier connected to the plated wire are not equal).

In a similar manner, a one-way transmission device embodying the above-described principles may be provided by means of a planar thin film spot deposited on a substrate material, such as glass. The thin, magnetic film spot is similarly a Permalloy element, which is formed in the presence of a magnetic field thereby establishing an "easy" and a "hard" direction of magnetization. Plated over the thin film spot is a sense line overlay which is adapted to be connected to a sense amplifier. Plated substantially orthogonal and over the sense line overlay is a drive line overlay, which is connected to a pulse generator. The one-way transmission characteristic of this embodiment operates in a similar manner to that described above with regard to the thin film-plated wire arrangement.

A one-way transmission device similar in operation to the thin film-plated wire and planar thin film devices may likewise be fabricated by utilizing ferrite cores. Thus, a sense winding is arranged with regard to a ferrite core so that one or more turns thereof are threaded through the hole before being connected to a sense amplifier; also, a single or multi-turn solenoid comprising the drive line, which is connected to a pulse generator, is arranged so that it passes around the core without threading the hole. When the drive winding is momentarily energized by the pulse generator, the magnetic moments of the ferrite core are rotated by the application of an orthogonal magnetizing force to an angle different from their preferred position around the circumference of the core. The slight rotation of the magnetic moments of the ferrite core induces a voltage in the sense winding and after the termination of this deflecting field, the moments realign themselves in accordance with their initial preferred orientations.

Thus, if we again consider the drive line as the input terminal and the sense line as the output terminal, then a signal placed on the input drive line is transmitted to the output sense line, but a signal placed on the output sense line is not re-transmitted to the input drive line. Therefore (as in the thin film-plated wire, or planar, thin film one-way transmission devices), a ferrite core in combination with a drive winding and a sense winding does not have the same transfer characteristic in one direction of propagation as it has for the reverse direction of propagation.

A plurality of any one of the one-way transmission devices described above are arranged in accordance with this invention to provide logical OR and NOR circuits. Thus, a logical OR gate may be fabricated by utilizing several thin film-plated wire, one-way transmission devices by arranging several drive lines in juxtaposition and substantially orthogonal to a single, plated wire sense line. The drive elements consisting of metal straps are connected to respective energizing means such as pulse generators. At each bit position along the length of the plated wire the magnetic film is magnetized so that all of the magnetization vectors have the same orientation along the "easy" axes. In other words, all the magnetization vectors are oriented as either binary zeros or binary ones.

The OR gate may, by way of example, consist of three drive lines, which are connected to respective pulse generators. Assuming that the three bit positions along the plated wire will each induce a negative signal (i.e., all of the magnetization vectors are oriented as binary ones as shown) on the sense line, then the energizing of any drive line will be interpreted by the sense amplifier as an execution of the logical OR function. However, a signal induced on the sense line by a signal on one drive line will not result in a signal being induced on any other drive line because of the one-way transmission feature mentioned earlier.

A logical NOR circuit can also be fabricated employing the above-mentioned thin film-plated wire one-way transmission devices. In a three drive line arrangement, the three bit positions are arranged along the plated wire sense line so that each of them produce positive polarity pulses (i.e., all of the magnetization vectors are oriented as binary zeros as shown) when the drive lines are energized. The positive signal induced in the sense line by the energizing of any one of the drive lines is interpreted by the sense amplifier as the execution of the NOR logical function. OR and NOR logic circuits can be similarly fabricated by utilizing planar thin film or ferrite core one-way transmission devices as will be explained in more detail hereinafter.

Referring now to the drawing and in particular to FIGURE 1, a thin film-plated wire, one-way transmission device is depicted. The plated wire 10 in a preferred embodiment is a 5 mil diameter beryllium copper wire substrate having a thin magnetic film formed on the surface thereof. The thin film is electroplated on the wire substrate with approximately a 10,000 Angstrom thickness of a Permalloy (80% nickel-20% iron) film.

The alloy coating is electroplated in the presence of a circumferential magnetic field that establishes a uniaxial anisotropy axis at right angles (i.e., around the circumference) to the length of the wire. The uniaxial anisotropy establishes an "easy" and "hard" direction of magnetization and the magnetization vectors of the thin film are normally oriented in one of two equilibrium positions along the "easy" axis, thereby establishing two bistable states necessary for binary logic operation. In other words, the "easy" axis is around the circumference and the "hard" axis is parallel to the sense line 10. The plated wire or sense line 10 is connected by an appropriate means to a sense amplifier 16. Thus, one end of the sense line 10 is grounded and has a return circuit via the sense amplifier 16. This type of connection provides a complete circuit path between the sense line 10 and the sense amplifier 16.

Placed substantially perpendicular and in juxtaposition to the sense line 10 is a drive line 12. The intersection of the sense line 10 and the drive line 12 is designated as a bit position 18. It should be noted that it is not necessary that the drive line 12 be perfectly perpendicular to the sense line 10 and hence, it may be skewed somewhat without seriously degrading the performance. The drive line, which is grounded, is connected to a pulse generator, which is also grounded. The drive element 12 in a preferred embodiment has a width dimension of 20 mils and is depicted in FIGURE 1 as being of a flat configuration. It should be understood however that other forms of the drive line 12 may be used, as for example, it may take the form of a single-turn or multi-turn solenoid.

When the pulse generator 14 energizes the drive line 12, a flux is generated by means of the current flow from the pulse generator to ground, thereby producing an orthogonal magnetizing force in accordance with Ampere's Rule. This orthogonal magnetizing force rotates the magnetization vectors at the bit position 18 from the "easy" toward the "hard" axis of magnetization. This rotation of the magnetization vectors induces a voltage in the sense line 10 whose polarity is dependent upon the particular orientation along the "easy" axis and is determined by the sense amplifier 16. Conventionally, the read out of a binary "zero" produces a positive signal, whereas a binary "one" produces a negative signal.

If the drive line 12 is considered as the input terminal to the one-way transmission device and the sense line 10 as the output terminal, then a signal present on the input terminal 12 will be transmitted immediately to the output line 10 by the above-mentioned magnetic induction. Thus, by rotating the magnetization vectors of the thin film from the "easy" toward the "hard" axis of magnetization, the lines of force produced by the magnetic thin film are rotated so that they sweep across the sense line 10, thereby inducing a voltage therein. It should be understood that the polarity of the voltage induced in the sense line 10 is independent of the direction of the current in the drive line and may be demonstrated by empirical methods. On the other hand, a signal present on the sense or output line 10 will not be re-transmitted to the input line 12. The reason for this one-way transmission effect is that although there is a voltage present on the output line which produces a current that in turn produces flux, this last-mentioned flux is parallel to the input line and therefore does not interlink the input line to induce a voltage therein.

The one-way transmission characteristics of the thin film, plated wire element shown in FIGURE 1 may be described more precisely in terms of the following mathematical equation, namely, $$Z_{21} \neq Z_{12}$$

where $Z_{12}$ is the open circuit transfer impedance as seen by the pulse generator 14 and $Z_{21}$ is the open circuit transfer impedance as seen by the sense amplifier 16. Thus, if some general network is cut at any two points and these terminals are considered as the input and output terminals of a four-pole network, then the open circuit transfer impedance between these two sets of terminals is different regardless of the direction in which it is measured.

In other words, if a current is injected into the drive line 12 and the resulting induced voltage is measured at the open circuited sense amplifier 16, then the ratio of these two quantities, namely, $$Z_{12} = \frac{V_1}{I_2} \frac{\text{(voltage at the sense amplifier)}}{\text{(current in drive line)}}$$

will result in some non-zero value, where $I_1$ (i.e., the current in the sense amplifier) equals zero.

On the other hand, if a current is injected into the sense line 10 and the resulting voltage is measured at the open circuited pulse generator 14, then the ratio of these two quantities, $$Z_{21} = \frac{V_2}{I_1} \frac{\text{(voltage at the pulse generator)}}{\text{(current in the sense line)}}$$

equals zero, where $I_2$ (i.e., the current in the drive line) equal zero.

The above mathematical expressions state that the device of FIGURE 1 provides a strong non-reciprocal relationship in that the one-way transmission device comprising the sense line 10 and the drive line 12 does not have the same transfer characteristic for one direction of propagation as it has for the reverse direction of propagation.

Figure 2:
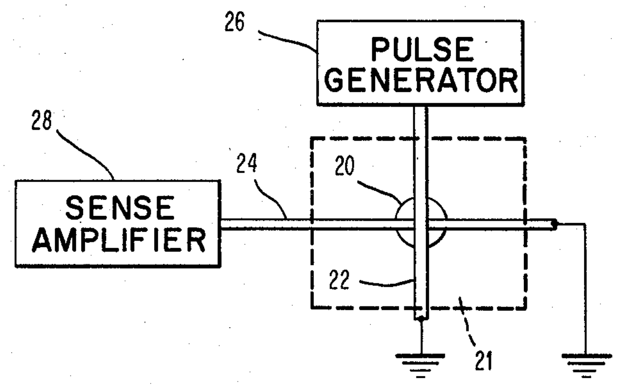
FIGURE 2 is a schematic view of a planar thin film, one-way transmission device having its associated circuitry depicted in block form.

FIGURE 2 depicts a planar thin film one-way transmission device, which is similar in operation to that described with respect to FIGURE 1. However, the fabrication of a planar thin film transmission device is slightly different. Thus, a thin, Permalloy film whose thickness is anywhere from several hundred to 10,000 Angstroms is deposited by evaporation or electrodeposition on a substrate material 21 such as glass. The thin film spot 20 is deposited in the presence of a magnetic field, which establishes both "easy" and "hard" directions of magnetization. After the thin film spot 20 has been deposited, a small width sense line 24 is positioned over the top thereof and is connected by appropriate means to a sense amplifier 28. Placed over the top of the thin film spot and substantially perpendicular to the sense line 24 is a drive line 22, which is connected to a pulse generator 26. The sense and drive lines together with the respective pulse generator and sense amplifier are grounded in a similar manner to that provided in the embodiment shown in FIGURE 1.

When the drive line 22 is energized by the pulse generator 26, a voltage is induced in the sense line 24 by the rotation of the magnetization vectors positioned along the "easy" axis of the thin film spot 20 toward the "hard" axis of magnetization. The polarity of the voltage induced in the sense winding 24 is dependent upon the particular orientation of the magnetization vectors along the "easy" axis. The polarity of the induced voltage is detected by the sense amplifier 28. The planar thin film device as depicted in FIGURE 2 is also characterized by a non-reciprocal relationship, that is, a voltage induced on the sense line 24 by the rotation of the magnetization vectors from the "easy" towards the "hard" axis of magnetization is transmitted to the sense amplifier 28, but a signal placed on the sense wire 24 will not be re-transmitted to the input line 22.

Figure 3:
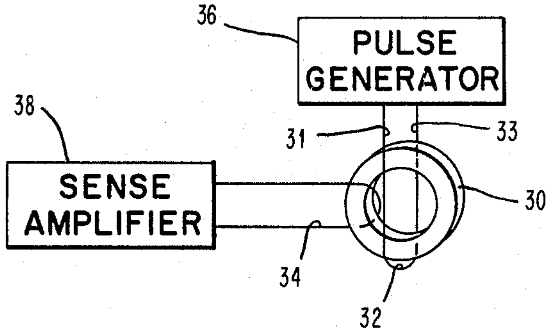
FIGURE 3 is another embodiment of a one-way transmission device employing a ferrite core with its associated circuitry shown in block form.

FIGURE 3 is a one-way transmission device, which employs a ferrite core 30. A sense winding 34 is threaded through the hole 40 of the ferrite core and is connected to a sense amplifier 38. A drive winding 32 is positioned diametrically to the ferrite core 30 and is arranged so that the front and rear portions 31 and 33 do not thread the hole 40. The winding 32 is connected to a pulse generator 36. The ferrite core 30 is composed of tiny magnetic moments, which exist throughout the material. A magnetic moment as considered herein is a magnetic force which can be represented by a vector. The magnetic moments of the core 30 tend to be aligned in a common direction around the circumference of the core once the core has been magnetized. When the drive line 32 is momentarily energized by the pulse generator 36, the magnetic moments in the ferrite core 30 are slightly rotated to a position differing from their preferred position. The rotation of the magnetic moments results from the application of the orthogonal magnetizing force caused by the current in the drive line 32. It is believed that the change in the flux pattern or the pattern of the magnetic moments within the ferrite core represents a transfer of energy from the drive winding to the sense winding which in turn causes a voltage of fixed polarity to be induced in the linking sense winding 34. The polarity of the voltage induced in the sense winding 34 is dependent upon the particular orientation of the magnetic moments around the ferrite core 30 prior to the drive signal (i.e., whether the magnetic moments are oriented clockwise or counter-clockwise). When the orthogonal field is removed, the vectors of the tiny magnetic moments snap back to their original positions, thereby conditioning the ferrite core 30 to again become energized by the winding 32 and the pulse generator 36.

The one-way transmission devices of the instant invention, which have been described with relation to FIGURES 1, 2 and 3 can be arranged to perform the basic OR and NOR logical functions. The above-mentioned basic logic functions are demonstrated by means of the Truth Table below.

TRUTH TABLE

| | Inputs | | | Output | |
|---|---|---|---|---|---|
| | X | Y | Z | OR | NOR |
| (a) | 0 | 0 | 0 | 0 | 1 |
| (b) | 0 | 1 | 0 | 1 (neg.) | 0 (pos.) |
| (c) | 1 | 1 | 0 | 1 (neg.) | 0 (pos.) |
| (d) | 1 | 1 | 1 | 1 (neg.) | 0 (pos.) |

The Truth Table or Table of Combinations above has been tabulated for three input signals X, Y and Z and a zero or a one in any column indicates the absence or the presence, respectively, of an input signal. The OR function performs logical addition and hence, the zero or the one state in the output column for an OR gate indicates the non-gating or gating, respectively, of the input signal. It should be noted that the column under the NOR function is directly opposite (i.e., phase inverted) the OR function for each of the input conditions set up in lines (a), (b), (c) and (d) of the Truth Table. The Truth Table will be discussed in more detail with regard to the logical circuits hereinafter described. It should be noted that the "0" and "1" binary conditions set forth in the output column of the Truth Table are not necessarily the same as the "0" (i.e., absence of a signal)

and "1" (i.e., presence of a signal) under the input columns as will be more fully explained below.

Figure 4:
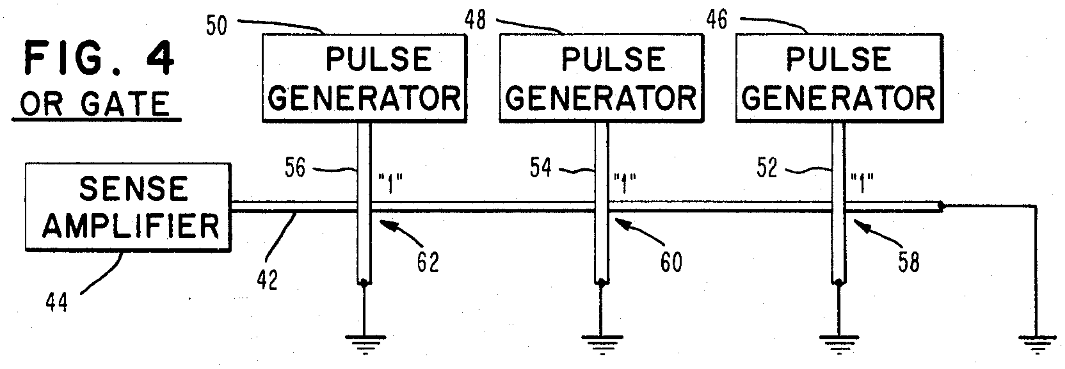
FIGURE 4 is a logical OR gate, which utilizes the thin film-plated wire one-way transmission device of FIGURE 1.

Referring now to FIGURE 4, a typical OR gate is depicted employing the thin film-plated wire, one-way transmission device described with regard to FIGURE 1. Thus, three unilateral conducting devices of the thin film-plated wire type are placed next to one another by arranging three drive lines 52, 54 and 56 substantially orthogonal and in juxtaposition to a sense line 42. Each of the drive lines 52, 54 and 56 is connected to a respective pulse generator 46, 48 and 50. At each of the bit positions 58, 60 and 62, the magnetic film coated on the plated wire 42 is magnetized along the "easy" axis to provide a binary "one". The binary "one" orientation along the "easy" axis is derived in the usual manner by simultaneously energizing a drive line by means of a pulse generator and a sense line by means of a bit driver, (not shown). As is understood in the art, the current in the drive line rotates the magnetization vectors toward the "hard" axis of magnetization and the proper polarity current in the bit line steers the vectors so as to provide the desired orientation along the "easy" axis of magnetization.

Referring back to the Truth Table and particularly to line (a) thereof, it is apparent that there is no gating of a signal in an OR circuit if there are no input signals X, Y or Z. Correlating this fact with FIGURE 4 this means that if the pulse generators 46, 48 and 50 do not energize the respective drive lines 52, 54 and 56, no output signal will be present on the sense line 42. In other words, no signal will be received by the sense amplifier 44, which indicates that the OR gate has not been permissed or conditioned.

The input conditions set forth in lines (b), (c) and (d) of the Truth Table are achieved when any one, two or all of the drive lines are energized by their respective pulse generators. Correlating this fact with FIGURE 4, this means that if either one, two or all of the pulse generators 46, 48 and 50 energize the respective drive lines 52, 54 and 56, an output signal will be developed on the sense line 42. Thus, the rotation of the magnetization vectors at the bit positions 58, 60 and 62 from the "easy" toward the "hard" axis of magnetization induces a negative polarity signal in the sense line 42. The negative signal induced in the sense line 42 is detected by the sense amplifier 44, which interprets the negative signal as the conditioning of the logical OR function.

It should be noted that when a signal is induced on the sense line, there are no sneak paths or back circuits to other input lines which is a very desirable feature in logic circuitry. This results from the fact that the one-way transmission device of this invention exhibits a strong non-reciprocal relationship. Thus, when two inputs are in the quiescent state and one input is energized in a logical OR circuit having a fan-in of three, current cannot be transferred from the energized drive line (input) to the other two via the magnetic paths between the sense line and the two drive lines since in fact magnetic coupling is nonexistent, i.e., $Z_{21}=0$. While the present invention does provide non-reciprocal signal transmission, it should be noted that it functions in a manner which is analogous to present non-reciprocal signal transmission arrangement when more than one input line is energized simultaneously. That is to say, if two lines are energized simultaneously, less current flows on each line than would flow if only one line were energized thus in effect slightly reducing the non-reciprocity.

Figure 5:
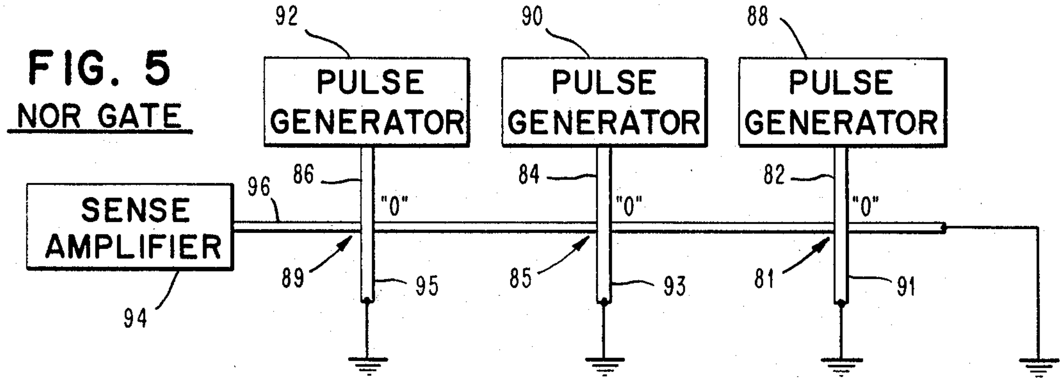
FIGURE 5 is a logical NOR gate employing the thin film-plated wire, one-way transmission device depicted in FIGURE 1.

The NOR (i.e., NOT OR) circuit of this invention is depicted in FIGURE 5. As is understood, the logical NOR gate provides a phase inverted output for the same input signals X, Y and Z as provided for in the OR gate. As previously mentioned above, the output column of the Truth Table indicates that whenever the output column registers a one for the OR function, the NOR gate output is correspondingly a zero.

The NOR gate of FIGURE 5 is similar to the OR gate embodiment of FIGURE 4. Thus, three one-way transmission devices consisting of the driver elements 91, 93 and 95 are positioned in juxtaposition and substantially orthogonal to the sense line 96, thereby forming the bit positions 81, 85 and 89. Each of the drive lines 91, 93 and 95 are connected respectively to the pulse generators 88, 90 and 92. The drive lines and the pulse generators are grounded to indicate that a continuous circuit path exists between any pulse generator and its respective drive line. The only substantial difference between the OR gate of FIGURE 4 and the NOR gate of FIGURE 5 is that the bit positions associated with the latter are magnetized along the "easy" axis as "zeros."

The circuits conditions set forth in lines (b), (c) and (d) of the Truth Table are achieved by energizing any one, two or all of the drive lines by means of their respective pulse generators. Thus, whenever any or all of the pulse generators 88, 90 and 92 energize the respective drive lines 91, 93 and 95, a positive signal (i.e., a positive signal caused by a "0" orientation around the "easy" axis) is induced in the sense line 96, which is applied to the sense amplifier 94. In other words, the positive voltage level applied to the sense amplifier 94 indicates the conditioning of the NOR gate.

As was suggested earlier, the "one" and "zero" in the output column of the Truth Table for the OR and NOR gates do not necessarily represent the same defined "zero" and "one" of the input. The presence of a signal on the input line, irrespective of polarity, will produce an output signal in the OR gate having a negative polarity and an output signal in the NOR gate having a positive polarity. Therefore, insofar as the OR gate is concerned if a no input signal condition is defined as "zero" input and the presence of a signal (irrespective of the polarity of that signal) is defined as a "one" input, then the output signals can be considered as almost defined in the same way as the input signals. The only difference in the OR gate being that the presence of a signal in the output will always be a signal of negative polarity irrespective of the polarity of the input dynamic signal. Having defined the presence of a dynamic output signal in the OR gate as a "one" and finding that the dynamic output signal from the NOR gate has a different polarity than the OR gate, we must define the dynamic output signal of the NOR gate as "zero." It follows that in the NOR gate if the dynamic output signal is defined as "zero" then the lack of an output signal must be defined as "one." Hence, in the NOR gate the definition of "zero" and "one" inputs noticeably differ from the definition of the outputs. A no signal input to the NOR gate is defined as being "zero" and yields a no signal output which is defined as a binary "one." A dynamic input signal to the NOR gate is defined as a binary "one" and yields a dynamic output signal (whose polarity is different from the dynamic output signal of the OR gate) which is defined as a binary "zero." Since the whole concept of binary "zero's" and binary "one's" is an arbitrary selection the foregoing definitions or ground rules are permissible and acceptable for the present OR and NOR gate.

The above explanation for the OR and NOR gates can be summarized as follows: an OR gate will be conditioned if one or more drive lines is energized by a pulse, which thereby induces a negative signal in the sense line; a NOR gate will be conditioned if one or more drive lines is energized by a positive or negative pulse, which thereby induces a positive signal in the sense line. It should be noted here that the OR and NOR gates described above are not necessarily intended to be connected to one another in a logical chain, but rather are intended to be used as separate circuit elements. This is not to say however that the OR and NOR gates of this invention could not be so combined as by the use of a specialized sense amplifier.

Such a specialized sense amplifier may consist, by way of example, of a preamplifier and an AND gate having a fan-in of two connected in series. The preamplifier is utilized to raise the amplitude of the signal, which is determined by the thickness of the thin film coating, induced in the sense line. Normally, the signal induced in a plated wire may vary from 10 to 50 millivolts. The two input signals received by the AND gate during a dynamic condition consist of a negative output signal from the preamplifier and a clock or strobe pulse, which is also negative. Thus during clock time, the AND gate is permissed and a negative output signal is provided (lines "*b*," "*c*" and "*d*" of the Truth Table) if any drive line (the X, Y, Z inputs) is energized. On the other hand, if there is no input signal (line "*a*" of the Truth Table at any of the drive lines X, Y or Z, one of the signals necessary to permiss the AND gate is absent, and the output thereof remains at ground or positive potential. The two polarity voltages necessary for binary logic operation are therefore apparent.

The sense amplifier 94 utilized with the NOR gate may similarly comprise a preamplifier and AND gate in series connection. In the no input condition of the NOR gate, (i.e., line "*a*" of the Truth Table) the amplifier is designed so that in the quiescent state its output has the same polarity as the clock pulse (i.e., negative), so that the AND gate is permissed and a negative output signal is produced. It should be noted that this signal is phase inverted from the no input condition of the OR circuit. However, in the event that any drive line is energized (lines "*b*," "*c*" and "*d*" of the Truth Table), the amplifier produces a positive signal during clock time that does not permiss the AND gate and hence the latter returns to ground or positive potential. This signal is similarly phase inverted for the same input condition of the OR circuit.

Figure 6:
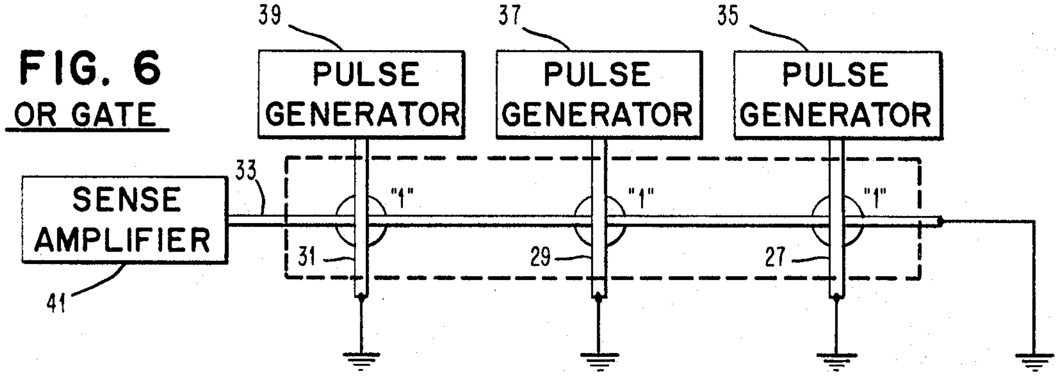
FIGURE 6 is a logical OR gate employing the planar thin film, one-way transmission device of FIGURE 2.
Figure 7:
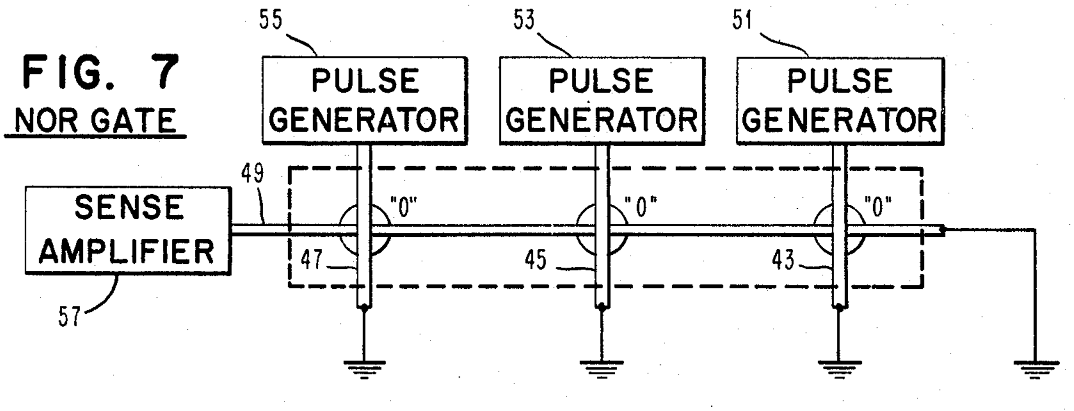
FIGURE 7 is a logical NOR gate employing the planar thin film, one-way transmission device of FIGURE 2.

FIGURES 6 and 7 depict OR and NOR gates, respectively, which are identical in operation to the OR and NOR gates of FIGURES 4 and 5. However, a distinction between FIGURES 6 and 7 over that of FIGURES 4 and 5 is that the OR and NOR gates of FIGURES 6 and 7, respectively, are fabricated in accordance with the planar thin film, one-way transmission devices of FIGURE 2. Accordingly, three planar thin film one-way transmission devices are positioned in juxtaposition to one another. Thus, a sense line overlay is positioned over three thin film spots, which are deposited on a conventional substrate material such as glass. The magnetic thin film spots have an "easy" axis orientation to provide a binary one. The sense line 33 is connected to a sense amplifier 41, which is identical in operation to that depicted in FIGURE 4. Positioned orthogonally to the sense line overlay 33 are three drive line overlays 27, 29 and 31, which are respectively connected to the pulse generators 35, 37 and 39.

The NOR gate of FIGURE 7 is similar in operation and fabrication to the OR gate of FIGURE 6 except that the orientation along the "easy" axis of the magnetization vectors provides a binary zero. Accordingly, three one-way transmission devices of the type described in FIGURE 2 are positioned in juxtaposition to one another. Thus, the sense line overlay 49 is positioned over the three thin film spots. Placed orthogonally to the sense line 49 and over the three thin film spots are three drive lines 43, 45 and 47, which are respectively connected to the pulse generators 51, 53 and 55.

Figure 8:
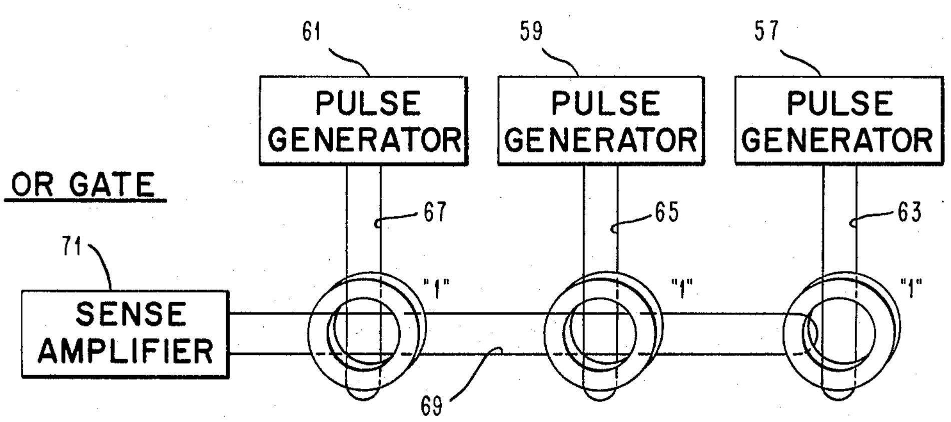
FIGURE 8 is a logical OR gate employing the ferrite core one-way transmission device of FIGURE 3.
Figure 9:
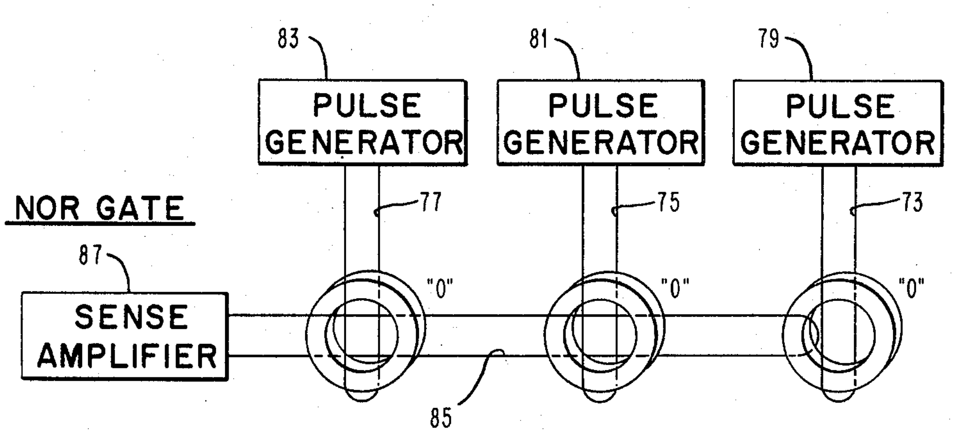
FIGURE 9 is a logical NOR gate employing the ferrite core one-way transmission device of FIGURE 3.

FIGURES 8 and 9 depict OR and NOR gates employing the one-way transmission devices of FIGURE 3. Thus, in FIGURE 8, three ferrite cores are arranged in juxtaposition to one another and each core includes a driving winding 63, 65 and 67, which is connected to a respective pulse generator 57, 59 and 61. Threaded through each hole of the core is a sense winding 69, which is connected to a sense amplifier 71. The magnetic moments of each ferrite core are arranged around the circumference of the core to produce a binary one. The OR gate of FIGURE 8 operates in a similar manner to that of FIGURE 4 and in accordance with the above-mentioned Truth Table.

FIGURE 9 is a NOR gate employing the ferrite core one-way transmission devices of FIGURE 3. Thus, each ferrite core element includes a drive line 73, 75 and 77 connected to a respective pulse generator 79, 81 and 83. Each core is threaded by a sense winding 85, which is connected to an appropriate sense amplifier 87. The magnetic moments of the ferrite cores of the NOR gate are magnetized around the circumference as binary zeros. The ferrite core NOR gate operates in a similar manner to that of FIGURE 5 and in accordance with the Truth Table discussed above.

The one-way transmission devices including the logical circuits formed therewith provide high reliability of operation in view of the rugged characteristics of the forming elements, such as the plated wire, the planar thin films, the ferrite cores, etc. Furthermore, the one-way transmission devices provided by this invention are relatively simple and economical to fabricate in view of the fact that planar thin films, plated wires and ferrite cores are adaptable to be mass produced.

In summary, the instant invention provides a one-way transmission device, which consists of a driver element placed in juxtaposition and substantially orthogonal to a wire substrate having a thin Permalloy film plated on the surface thereof. Such a device may also be fabricated by depositing a planar thin film spot on a substrate material such as glass and forming a sense and drive line overlay over the spot. A unilateral conducting device may also be fabricated by utilizing a ferrite core in conjunction with a driving element positioned around the diameter of the core and a sense winding threaded through the hole of the core. The above-mentioned one-way transmission devices whether of the planar thin film, plated wire or ferrite core type are arranged so that by considering the drive line as the input means and the sense line as the output means, then a signal present on the input line will be transmitted to the output line but a signal placed on the output line will not be re-transmitted to the input line. In other words, the one-way transmission devices of the instant invention provides a strong non-reciprocal relationship.

Furthermore, by arranging several of the one-way transmission devices of the instant invention next to one another so that driver elements induce either a positive or negative signal in an associated sense winding, logical OR and NOR gating circuits may be provided. The logical circuits provided by this invention are such that during the energizing of one of several inputs, sneak paths due to magnetic coupling between the energized input elements and the quiescent input elements are nonexistent.

Obviously, many modifications and variations of the present invention are possible in the light of the above teaching. It is therefore to be understood that within the scope of the appended claims, the invention may be practiced otherwise than as specifically described.

The embodiments of the invention in which an exclusive property or privilege is claimed are defined as follows:

1. A logic circuit comprising, a plurality of first generator means continually providing a respective first flux, which is in the same direction, a sense means positioned contiguous to said plurality of first flux generator means and disposed both substantially orthogonal to and so as to be linked by said first flux, said sense means adapted to be connected to a sense amplifier, a plurality of second flux generator means adapted to be connected to respective energizing means, each different one of said second flux generator means being positioned substantially orthogonal to said sense means and comprising a sole conductor at each said first flux generator means in juxtaposition to respective different ones of said first flux generator means, any one or several of said plurality of second flux generator means when energized by said respective energizing means to accomplish logical functions producing respective second fluxes, which second fluxes are applied in a direction orthogonal to said respective first fluxes thereby rotating said first fluxes to produce a current and voltage in said sense means which is detected by said sense amplifier, said current in said sense means producing a third flux which is parallel to said plurality of said second flux generator means, said third flux being substantially decoupled from said second flux generator means.

2. A logic circuit in accordance with claim 1 wherein said first generator means comprises a thin magnetic film having a uniaxial anisotropy establishing "easy" directions for magnetization vectors formed on the surfaces of a wire substrate.

3. A logic circuit in accordance with claim 1 wherein said first generator means comprises a thin magnetic film spot formed on a substrate material, said thin film spot incorporating a uniaxial anisotropy establishing "easy" directions for magnetization vectors.

4. A logic circuit in accordance with claim 1 wherein said first generator means comprises a ferrite core.

5. A logical circuit comprising, a plurality of first generator means, each said first generator means continually providing a first flux in a first direction, a sense means positioned contiguous to said plurality of first flux generator means and disposed both substantially orthogonal to and so as to be linked by said first flux, said sense means adapted to be connected to a sense amplifier, a plurality of second flux generator means adapted to be connected to respective energizing means, each different one of said second flux generator means being positioned substantially orthogonal to said sense means and comprising a sole conductor at each said first flux generator means in juxtaposition to respective different ones of said first flux generator means, an OR circuit being conditioned when any or all of said plurality of second flux generator means produce respective second fluxes when energized by said respectives energizing means, said respective second fluxes being applied in a direction orthogonal to said respective first fluxes thereby rotating said respective first fluxes to produce a current and voltage in said sense means which is detected by said sense amplifier, said current in said sense means producing a third flux which is parallel to said plurality of said second flux generator means, said third flux being substantially decoupled from said second flux generator means.

6. A logical circuit in accordance with claim 5 wherein said first generator means comprises a thin magnetic film having a uniaxial anisotropy establishing an "easy" direction for magnetization vectors formed on the surface of a wire substrate, said magnetization vectors being oriented in a first direction along said "easy" axes.

7. A logical circuit in accordance with claim 5 wherein said first generator means comprises a thin magnetic film spot formed on a substrate, said thin film spot incorporating a uniaxial anisotropy establishing an "easy" direction for magnetization vectors, said magnetization vectors being oriented in a first direction along said "easy" axes.

8. A logical circuit in accordance with claim 5 wherein said first generator means comprises a ferrite core which is magnetized in a first direction.

9. A logical circuit in accordance with claim 5 wherein said first generator means continually provides a first flux in a second direction to effect a change of polarity of the current and voltage signals produced in said sense means from the current and voltage signals when said first flux is in a first direction thereby conditioning a NOR device.

10. A logical circuit in accordance with claim 9 wherein said first generator means comprises a thin magnetic film having a uniaxial anisotropy establishing an "easy" direction for magnetization vectors formed on the surface of a wire substrate, said magnetization vectors being oriented in a second direction along said "easy" axes.

11. A logical circuit in accordance with claim 9 wherein said first generator means comprises a thin magnetic film spot formed on a substrate, said thin film spot incorporating a uniaxial anisotropy establishing an "easy" direction for magnetization vectors, said magnetization vectors being oriented in a second direction along said "easy" axes.

12. A logical circuit in accordance with claim 9 wherein said first generator means comprises a ferrite core which is magnetized in a second direction.

References Cited

"Megacycle Magnetic Rod Logic" by Meier et al. IRE-Wescon Convention Record, vol. 3, part 4, Aug. 31, 1959, pp. 27–31.

Tillman, R. M., "Fluxlok, a Nondestructive Random Access Electrically Alterable, High-Speed Memory Technique using Standard Ferrite Memory Cores." IRE Transactions on Electronic Computers, September 1960, pp. 323–328.

Bradley, E. M., "Properties of Magnetic Films for Memory Systems," Journal of Applied Physics Supplement to vol. 33, No. 3, pp. 1051–1056, March 1962.

Bittmann, E. E., "Using Thin Films in High Speed Memories." Electronics June 5, 1959, pp. 55–57.

STANLEY M. URYNOWICZ, Jr., *Primary Examiner.*

JAMES W. MOFFITT, *Examiner.*

R. N. MORGANSTERN, *Assistant Examiner.*